United States Patent Office 2,706,202
Patented Apr. 12, 1955

2,706,202

BICYCLOHEPTANE DERIVATIVES AND PROCESS FOR PREPARING THE SAME

Abraham Bavley, Brooklyn, and Charles J. Knuth, Forest Hills, N. Y., assignors to Chas. Pfizer & Co., Inc., Brooklyn, N. Y., a corporation of Delaware No Drawing. Application December 7, 1953,
Serial No. 396,752

7 Claims. (Cl. 260—455)

This invention relates to new addition products of certain diene adducts, and more particularly, to aliphatic thioacid addition products of [2,2,1]bicycloheptenes and to processes for preparing the same. These novel products are useful as intermediates in organic synthesis, as industrial and/or agricultural fungicidal agents, and as plasticizers for vinyl chloride polymers, copolymers and the like.

The compounds which this invention is concerned with may be described by the following formula:

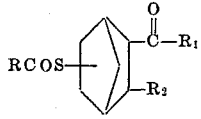

wherein R is alkyl; $R_1$ is alkyl or alkoxy; and $R_2$ is hydrogen, carboalkoxy or acylthio, $R_2$ being hydrogen or acylthio when $R_1$ is alkyl, and carboalkoxy when $R_1$ is alkoxy. R, $R_1$ and $R_2$ may contain from 1 to 18 carbon atoms. Thus R and $R_1$ may be methyl, ethyl, propyl, hexyl, decyl, octadecyl, etc.; $R_1$ may also be methoxy, ethoxy, hexadecoxy and the like; $R_2$ may be carbomethoxy, carboethoxy, carbobutoxy, carboheptadecoxy, or acetylthio, propionylthio, hexonylthio, heptadeconylthio, and so forth.

These compounds are prepared by the reaction of [2,2,1] bicycloheptenes with an aliphatic thioacid, such as thioacetic acid, thiopropionic acid, thiobutyric acid, thioisobutyric acid and the like. The [2,2,1] bicycloheptenes are in turn prepared by the Diels-Alder reaction or "diene" synthesis, a reaction well known in the art. To illustrate further, various reactions between aliphatic thioacids and Diels-Alder adducts are hereinafter set forth.

For example, the reaction between an aliphatic thioacid and a 2-acyl, bicyclo [2,2,1] heptene-5 may be described in the following manner:

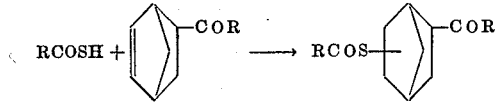

R being an alkyl group as described. The 2-acyl, bicyclo [2,2,1] heptene-5 is readily prepared by the Diels-Alder reaction of an alkyl vinyl ketone with cyclopentadiene.

The use of a 2-acyl, 3-halo, bicyclo [2,2,1] heptene-5 in this reaction results in the following:

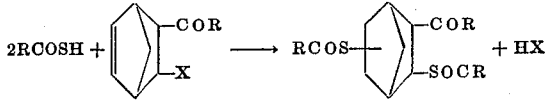

X being halogen and R being alkyl. The 2-acyl, 3-halo, bicyclo [2,2,1] heptene-5 may be a Diels-Alder adduct of an alkyl β-halovinyl ketone and cyclopentadiene.

In addition, when one employs a 2,3-dicarboalkoxy bicyclo [2,2,1] heptene-5, the reaction proceeds as follows:

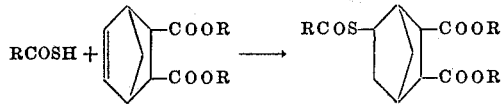

R again being alkyl. In this case, the bicycloheptene is prepared by forming an adduct of cyclopentadiene and maleic anhydride, followed by esterification of the resulting adduct to form a dialkyl ester thereof.

As indicated above, the aliphatic thioacid adds to the ethylenic linkage in the various Diels-Alder adducts described to form the desired [2,2,1] bicycloheptane derivatives. In the reaction of the thioacid with a 2-acyl, 3-halo, bicyclo [2,2,1] heptene-5 (the adduct of cyclopentadiene and an alkyl β-halovinyl ketone), not only does the addition occur, but the halogen atom of the bicycloheptene is displaced by the thioacyl group. The reactions proceed well without a catalyst. In each case, it is preferred to employ stoichiometric quantities of the reactants, i. e. 1 or 2 moles of aliphatic thioacid per mole of bicycloheptene, depending upon the particular reaction involved. However, a slight excess above these amounts does no harm, and even with less than the preferred amount of aliphatic thioacid the desired products may be obtained. In fact, with only one mole of the thioacid per mole of 2-acyl, 3-halo, bicyclo [2,2,1] heptene-5, the desired addition of the thioacyl group to the unsaturated portion of the ring, and the replacement of the halogen on the ring with another thioacyl group both occur to a substantial degree. The disubstituted thioacyl bicycloheptane thus formed is particularly unexpected in view of the different reactions involved, one being addition and the other replacement. Since the reaction is strongly exothermic, it is preferred to mix the reactants slowly with cooling to maintain the temperature of the mixture below the boiling point of the thioacid. After they have been thoroughly mixed, they are permitted to stand for a short period, say up to an hour. The product can then readily be purified by distillation under reduced pressure.

The invention is still further illustrated by the following examples which are not intended to impose any limitation thereon.

Example I

Methylvinyl ketone was reacted with cyclopentadiene to form the adduct, 2-acetyl bicyclo [2,2,1] heptene-5. Then 10.0 g. (.132 mole) of thioacetic acid was added dropwise to 13.2 g. (.097 mole) of the adduct with cooling to keep the temperature below 80° C. After all of the adduct had been added, the mixture was permitted to stand at room temperature for one hour. Thereafter, it was distilled under vacuum to obtain 15.7 g. of a colorless liquid boiling between 94–96° C. at 0.05 mm. The yield of this product was 76% and its analysis was as follows:

|   | Calculated | Found |   |
|---|---|---|---|
| C | 62.23 | 62.18 | $d_4^{20}=1.107$ |
| H | 7.60 | 7.62 |   |
| S | 15.10 | 15.34 | $n_D^{25}=1.5184$ |

Example II

Example I was repeated with 2-propionyl bicyclo [2,2,1] heptene-5 (the ethylvinyl ketone adduct of cyclopentadiene). A colorless liquid boiling in the range of 107–108° C. at 0.04 mm. was thus obtained in 86% yield. The analysis of this product is given below:

|   | Calculated | Found |   |
|---|---|---|---|
| C | 63.68 | 63.70 | $d_4^{20}=1.120$ |
| H | 8.02 | 8.15 |   |
| S | 14.14 | 14.22 | $n_D^{25}=1.1520$ |

Example III

The procedure of Example I was again followed with 2-propionyl-3-chloro-bicyclo [2,2,1] heptene-5 (the ethyl β-chlorovinyl ketone adduct of cyclopentadiene). However, in this case 37.0 g. (0.2 mole) of the adduct was reacted with 20.0 g. (0.26 mole) of thioacetic acid. The reaction resulted in the introduction of two thioacetyl groups to the bicycloheptene ring, one replacing the chlorine and the other adding to the ethylenic linkage in the adduct. The product, a pale yellow, viscous liquid, was obtained in 51% yield based on thioacetic acid, and boiled in the range of 155–158° C. at 0.06 mm. Its analysis follows:

|    | Calculated | Found |                   |
|----|------------|-------|-------------------|
| C  | 55.97      | 56.11 | $d_4^{20}=1.194$  |
| H  | 6.71       | 6.87  |                   |
| S  | 21.35      | 21.27 |                   |
| Cl | 0          | 0.02  | $n_D^{25}=1.5396$ |

*Example IV*

2,3-dicarbobutoxy bicyclo [2,2,1] heptene-5 was prepared by esterifying carbic anhydride with butanol, carbic anhydride being an adduct of maleic anhydride and cyclopentadiene. The esterified adduct was then reacted with thioacetic acid in accordance with the procedure outlined in Example I. Upon completion of the reaction a 77% yield of a colorless liquid was obtained, boiling between 157–184° C. at 0.07 mm. Analysis of the product appears below:

|   | Calculated | Found |                   |
|---|------------|-------|-------------------|
| C | 61.59      | 61.76 | $d_4^{20}=1.128$  |
| H | 8.16       | 8.26  |                   |
| S | 8.66       | 8.55  | $n_D^{25}=1.4910$ |

Resort may be had to such modifications and equivalents as fall within the spirit of the invention and the scope of the appended claims.

What is claimed is:

1. A compound represented by the following formula:

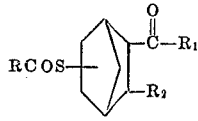

wherein R is an alkyl radical; $R_1$ is selected from the group consisting of alkyl and alkoxy radicals; $R_2$ is selected from the group consisting of hydrogen and acylthio radicals when $R_1$ is alkyl; and $R_2$ is carboalkoxy when $R_1$ is alkoxy.

2. A compound represented by the following formula:

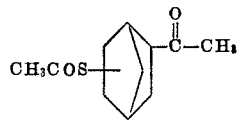

3. A compound represented by the following formula:

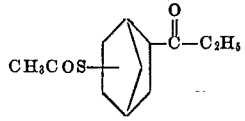

4. A compound represented by the following formula:

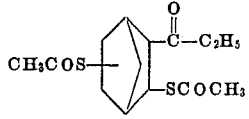

5. A compound represented by the following formula:

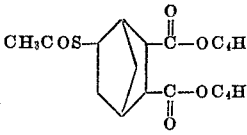

6. In a process for preparing thioacid addition products of [2,2,1] bicycloheptenes, the step which comprises reacting an aliphatic thioacid with a Diels-Alder adduct selected from the group consisting of 2-acyl,bicyclo [2,2,1] heptene-5; 2-acyl, 3-halo, bicyclo [2,2,1] heptene-5; and 2,3-dicarboalkoxy bicyclo [2,2,1] heptene-5.

7. The process of claim 6 wherein approximately 1 to 2 moles of said aliphatic thioacid per mole of Diels-Alder adduct are employed.

No references cited.